US007138945B1

(12) United States Patent
Newman et al.

(10) Patent No.: US 7,138,945 B1
(45) Date of Patent: Nov. 21, 2006

(54) METHOD AND APPARATUS FOR SELECTING A FOGHORN BLAST PATTERN

(75) Inventors: Kent David Newman, Hurst, TX (US); Todd William Crocker, Flower Mound, TX (US)

(73) Assignee: Uniden America Corporation, Ft. Worth, TX (US)

( * ) Notice: Subject to any disclaimer, the term of this patent is extended or adjusted under 35 U.S.C. 154(b) by 0 days.

(21) Appl. No.: 11/115,044

(22) Filed: Apr. 25, 2005

(51) Int. Cl.
*G01S 5/02* (2006.01)

(52) U.S. Cl. ............................ 342/357.17; 342/357.06

(58) Field of Classification Search ........... 342/357.06, 342/357.07, 357.1, 357.13, 357.17; 701/207, 701/213
See application file for complete search history.

(56) References Cited

U.S. PATENT DOCUMENTS 1,410,626 A * 3/1922 Taylor ........................ 181/125
2,935,565 A * 5/1960 Macadam et al. ..... 379/167.01
5,515,026 A * 5/1996 Ewert ......................... 340/436
6,630,891 B1 * 10/2003 Dilling ....................... 340/902
2005/0075788 A1 * 4/2005 Smith et al. ................ 701/301

* cited by examiner

*Primary Examiner*—Dao Phan
(74) *Attorney, Agent, or Firm*—Lawrence R. Youst; Kenneth T. Emanuelson; Danamraj & Youst, P.C.

(57) ABSTRACT

A marine vessel (102) is operable to emit an audible signal based upon the velocity status of the marine vessel (102). The marine vessel (102) includes a first processor component (340) operable to determine the velocity of the vehicle based upon signal inputs (140, 142, 144). The marine vessel (102) further includes a database (310) containing a set of at least two audible signals. A second processor component (300) is operable to select an audible signal from the set of at least two audible signals based on the velocity of the marine vessel (102). A loudspeaker (110) emits the selected audible signal from the marine vessel (102).

17 Claims, 7 Drawing Sheets

METHOD AND APPARATUS FOR SELECTING A FOGHORN BLAST PATTERN

TECHNICAL FIELD OF THE INVENTION

The present invention relates, in general, to marine foghorn blast patterns and in particular to a method and apparatus for selecting a foghorn blast pattern based on data received from a global positioning system.

BACKGROUND OF THE INVENTION

The United States Federal Government's NAVSTAR system, known generically as the global positioning system (GPS), provides worldwide positioning capability to its users with a system employing a set of fixed ground-based GPS controllers and a set of GPS satellites providing information suitable for use by passive GPS receivers. At any given time, there are at least 24 GPS satellites in operation, each orbiting Earth once every 12 hours at an altitude of 11,000 nautical miles. The position of each GPS satellite in the GPS system is calculated based on the relationship between that GPS satellite and one or more of the fixed ground-based GPS controllers.

Various components of the GPS system are operable to determine the distance between themselves, and therefore their respective positions, based on the time elapsed between the transmission of an electromagnetic signal by one GPS component and the receipt of the signal by another. Using this methodology, the GPS system has the capability to accurately determine the position of each GPS satellite with respect to the fixed ground-based GPS controllers, and therefore to the Earth itself.

Given that the electromagnetic GPS signals are traveling at the speed of light and that the distances involved are relatively short, the accuracy of the distance calculation depends on highly accurate timing synchronization, which is handled primarily with atomic clocks disposed within the various components of the system.

Each of the GPS satellites transmits signals to the other components of the GPS system. Civilian GPS satellite signals are transmitted at a frequency of 1575.42 MHz in the UHF band, while military GPS signals are transmitted at 1227.6 MHz. Signals at these frequencies can pass through clouds and fog, but will not pass through most solid objects such as buildings and mountains. Accordingly, a passive GPS receiver must have a clear line-of-sight to the GPS satellites necessary for positioning. A GPS satellite signal contains a pseudorandom satellite identification code, "ephemeris data" and "almanac data". Ephemeris data reflects satellite status and current date and time. Almanac data discloses the position of the GPS satellite and other GPS satellites in the system.

Within this framework of GPS satellites having known positions at known times, a passive GPS receiver can determine its position with respect to the Earth using the signal delay reckoning method described above. Signals from multiple satellites are required in order to calculate the position of the passive GPS receiver. Given the signal from only a single GPS satellite, a passive GPS receiver can determine only that it is at a point on a sphere of a known radius centered on a GPS satellite having a known position. Given the signal from two GPS satellites, a passive GPS receiver can determine that it is at a point on the intersection of two spheres having known radii and known central points. Based on the principles of geometry, the intersection of two such spheres is a circle lying on the plane of intersection of the two spheres. Given the signal from three GPS satellites, a passive GPS receiver can determine that it is at a point on the intersection of three spheres having known radii and known central points. The intersection of three spheres is a set of two discrete points. Accordingly, given three GPS satellite signals, a passive GPS receiver can limit the range of its possible locations to two discrete points in three-dimensional space. In practice, it is often the case that only one of these two points is near the surface of the Earth. Given four or more GPS satellite signals, the location of the passive GPS receiver can be limited to a single discrete point within a certain margin of error. As the number of GPS satellites is increased, the margin of error is, of course, reduced.

The utility of a GPS receiver to the user is much improved through the inclusion of map display capability within the GPS receiver. With this capability, the user of a GPS receiver is able to reference his or her present global position to nearby roads, geographic landmarks, and other points of interest included in the map data stored within, and displayed by, the GPS receiver.

SUMMARY OF THE INVENTION

The present invention relates to a method and apparatus for automatically selecting a marine foghorn blast pattern for a vessel based upon the velocity status of the vessel at a point in time. In certain embodiments, the velocity status of the vessel is determined using global positioning signals received at the vessel at various points in time. The change in position over the change in time determines the velocity of the vessel. Based upon the status of the vessel, the proper foghorn pattern is selected and played.

In one aspect, the present invention is directed to a marine vessel operable to emit an audible signal based upon the velocity status of the marine vessel. The marine vessel includes a first processor component operable to determine the velocity of the vehicle based upon signal inputs. The vessel further includes a database containing a set of at least two audible signals. A second processor component is operable to select an audible signal from the set of at least two audible signals based on the velocity of the marine vessel. A loudspeaker emits the selected audible signal from the vehicle.

In certain embodiments, the selected audible signal represents the foghorn pattern for a marine vessel underway, undertow, stopped, aground or anchored. In certain embodiments, the received signal inputs are global positioning signal inputs. The first processor component may be a portion of a global positioning system receiver. The second processor component may be a portion of a fixed mount marine radio. Alternately, the first and second processor components may be portions of a single processor. The audible signals may be stored in an electronic format such as .wav files, .mp3 files, .wma files and the like.

In another aspect, the present invention is directed to an apparatus for emitting a velocity-related signal from a marine vessel having a velocity. The apparatus includes a processor operable to calculate the velocity of the marine vessel, a means for selecting a signal from a set of two or more signals based on the velocity of the marine vessel and a means for emitting the signal from the marine vessel.

In a further aspect, the present invention is directed to a method of emitting a velocity-related audible signal from a marine vessel having a velocity. The method includes the steps of determining the velocity of the marine vessel, selecting a signal from a set of two or more signals based on the velocity of the marine vessel and emitting the signal from the marine vessel.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
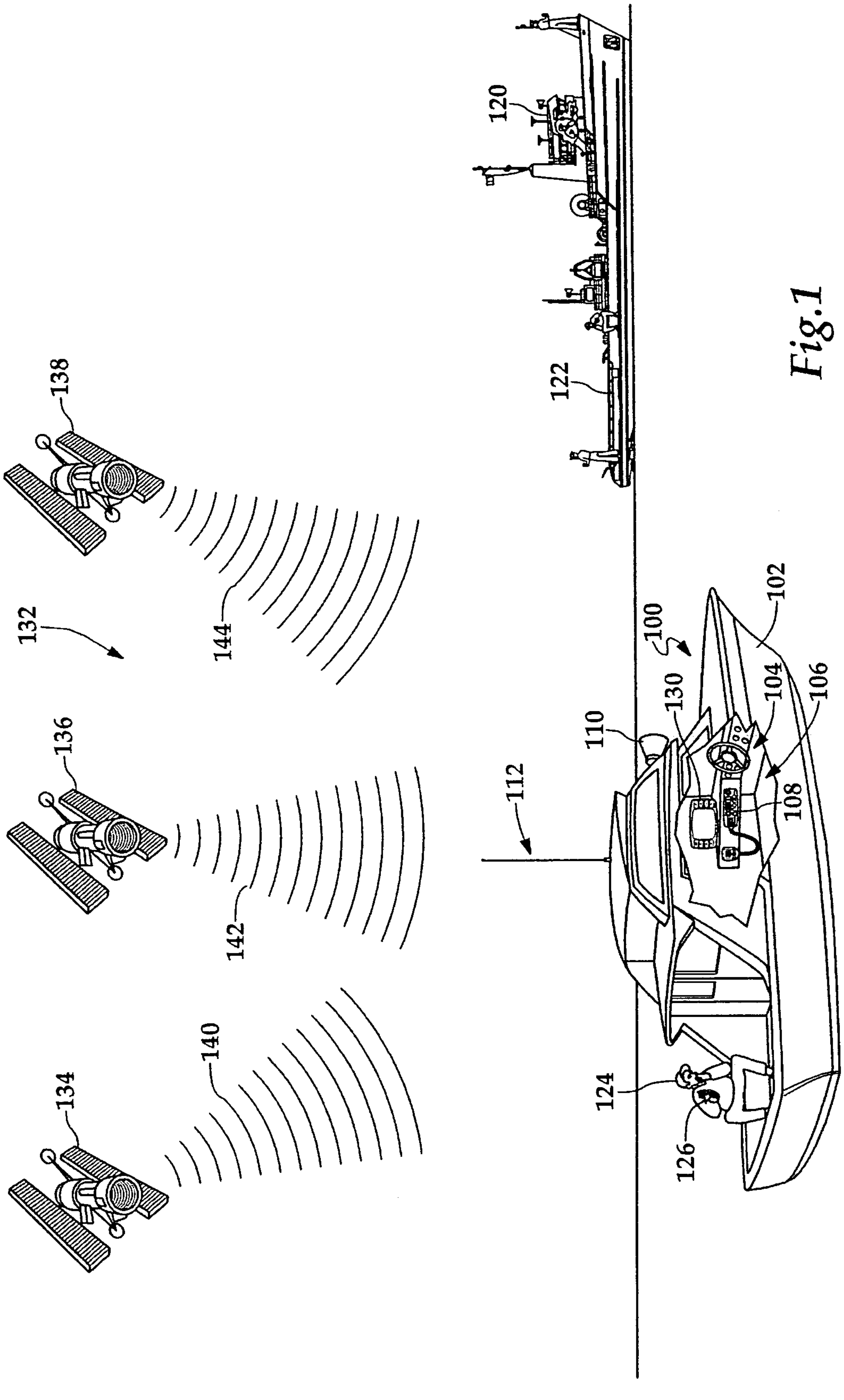
FIG. 1 is an view of a marine radio communication system incorporating global positioning capability disposed onboard a waterborne marine vessel according to certain embodiments of the present invention.

Referring initially to FIG. 1, a marine radio communication system 100 of the present invention is shown employed onboard a marine vessel 102. A shipboard radio station 104 positioned at the bridge 106 of marine vessel 102 is fitted with a fixed mount marine radio frequency transceiver, or marine radio 108. A loud speaker 110 and marine radio frequency antenna 112 are coupled to fixed mount marine radio 108 to provide audio and radio frequency marine communications, respectively. Preferably, fixed mount marine radio 108 is a very high frequency (VHF) frequency modulation (FM) transceiver that allows shipboard radio station 104 to communicate with shipboard radio stations such as shipboard radio station 120 onboard nearby marine vessel 122 and coastal radio stations (not shown) over medium range distances by generating and receiving frequency modulated electromagnetic (EM) signals at certain predetermined radio frequency channels, specifically marine radio frequency channels. In certain embodiments, fixed mount marine radio 108 is able to send and receive on all USA and International marine radio frequency channels.

A seaman 124 is holding a marine radio remote wireless handset 126 which wirelessly communicates with fixed mount marine radio 108, thereby enabling an operator to send and receive marine communications from any position on marine vessel 102. For example, as illustrated, seaman 124 is positioned towards the aft of the marine vessel 102 and away from the bridge 106 and fixed mount marine radio 108. Marine radio remote wireless handset 126, however, facilitates marine communication via wireless communication with fixed mount marine radio 108.

According to the present invention, fixed mount marine radio 108 is operably connected to a mobile global positioning system (GPS) receiver 130 operable to determine its position using signals received via GPS antenna 150 from the GPS system 132. The GPS system 132 incorporates a set of GPS satellites 134, 136, 138, each transmitting a GPS signal 140, 142, 144, respectively. Each of the GPS signals 140, 142, 144 may include a satellite identification code, satellite status data, the current date and time and the position of the GPS satellite 134, 136, 138 transmitting the GPS signal 140, 142, 144 and of other GPS satellites 134, 136, 138 in the GPS system 132.

As shown in FIG. 1, GPS receiver 130, disposed within marine vessel 102, acquires GPS signals 140, 142, 144 via GPS antenna 150. Using GPS signals 140, 142, 144, the GPS receiver 130 can calculate the location of marine vessel 102. As discussed above, GPS signals 140, 142, 144 from multiple GPS satellites 134–138 are required in order to calculate the position of the GPS receiver 130. In fact, the three GPS satellites 134, 136, 138 shown in FIG. 1 are considered the minimum number of GPS satellites necessary to determine the current position of GPS receiver 130. Additional GPS satellites (not shown) will facilitate a higher level of precision in locating the GPS receiver 130.

In addition to ship-to-ship communication via marine radios, marine vessels such as vessels 102, 120 normally incorporate additional means of communication suitable for conveying information from one vessel to another, including visible means and audible means. Visible means include patterns of visible elements, including flags, balls and lights, prominently displayed on a vessel. The pattern employed in the display determines the message conveyed to other vessels. Visible communication means have the advantage that they communicate with all nearby vessels simultaneously and continuously, and can be perceived at a substantial distance in clear conditions. While visible communication means are very effective in conditions of high visibility, the effectiveness of flags, balls and lights is reduced as visibility is restricted. Further, visual means of communication cannot be modified quickly as conditions change. Accordingly, audible communication means are also employed to communicate between marine vessels. These audible means include whistles, bells, gongs and horns.

For purposes of illustration of the present invention, the foregoing discussion relates primarily to waterborne marine vessels navigating in conditions of restricted visibility. Those of skill in the art will appreciate, however, that the teachings of the present invention can be employed in any context in which an audible signal is generated according to the status of a marine vessel. When navigating in conditions of restricted visibility, U.S. Coast Guard regulations require that certain precautions be taken in order to avoid collisions between waterborne marine vessels near one another. As used herein, the term "restricted visibility" means any condition in which visibility is restricted by fog, mist, falling snow, heavy rainstorms, sandstorms or any other similar causes. Each vessel is required, for example, to proceed at a safe speed adapted to the prevailing circumstances and conditions of restricted visibility. Power-driven marine vessels operating under restricted visibility conditions are required to have their engines ready for immediate maneuver at all times. Finally, one of the principal precautions to be undertaken in conditions of restricted visibility is the use of a foghorn.

According to convention and applicable regulations, a vessel's foghorn plays a distinct pattern selected according to the current status of the vessel. The general status of the vessel at a given time is either moving or non-moving. The specific status of the vessel is selected from 'underway', 'undertow', 'stopped', 'anchored' or 'aground'. The foghorn patterns to be played enable nearby vessels to determine the status of the vessel under conditions of restricted visibility. Regulations require, for example, that a power-driven vessel making way through the water sound a single prolonged blast every two minutes. If the power-driven vessel is stopped, a pattern of two prolonged blasts separated by a two second pause is sounded every two minutes. These particular patterns are presented only by way of examples illustrating the patterns that may be played under certain conditions, and are not intended to limit the scope of the present invention in any manner. Any marine vessel which receives a foghorn signal from a source ahead of its beam is required to reduce its speed to the minimum at which the vessel can be kept on course until the risk of collision can be evaluated and eliminated.

The appropriate foghorn pattern varies not only by the status of the vessel, but also by its type. Sailing vessels, fishing vessels and towing vessels, for example, do not use the above described patterns for underway and stopped, but use alternate patterns provided by the applicable regulations. The point being illustrated is that the patterns vary by vessel type as well as by vessel status.

In order to comply with all necessary regulations and maximize safety, marine radio 108 incorporates audible signal functionality through loudspeaker 110, which can be used for automatically emitting appropriate foghorn signals according to the status of marine vessel 102. In certain embodiments, the audible signals played through loudspeaker 110 are digitally stored in memory within marine radio 108. In certain embodiments, the status of marine vessel 102 is automatically determined using signals received from the GPS system 132, as described in further detail below.

According to at least one embodiment of the present invention, the foghorn function of marine radio 108 may have the following optional modes of operation:

Underway: Fog signal for powered vessel underway.
Stop: Fog signal for vessel that is stopped.
Sail: Fog signal for sailboat, fish boat, towboat.
Tow: Fog signal for a vessel under tow.
Anchor: Fog signals for a vessel at anchor.
Aground: Fog signals for any vessel aground.

According to the present invention, marine radio 108 incorporates at least one automatic mode of audible signal operation. In certain embodiments, marine radio 108 can be set to sound an underway foghorn pattern automatically when marine vessel 102 is moving, and a stopped, anchored or aground foghorn pattern when marine vessel 102 is not moving. Similarly, marine radio 108 may be set to sound an undertow foghorn pattern automatically when marine vessel 102 is moving, and a stopped, anchored or aground foghorn pattern when marine vessel 102 is not moving. These functions are described in particular detail below in connection with FIGS. 5–7.

Figure 2:
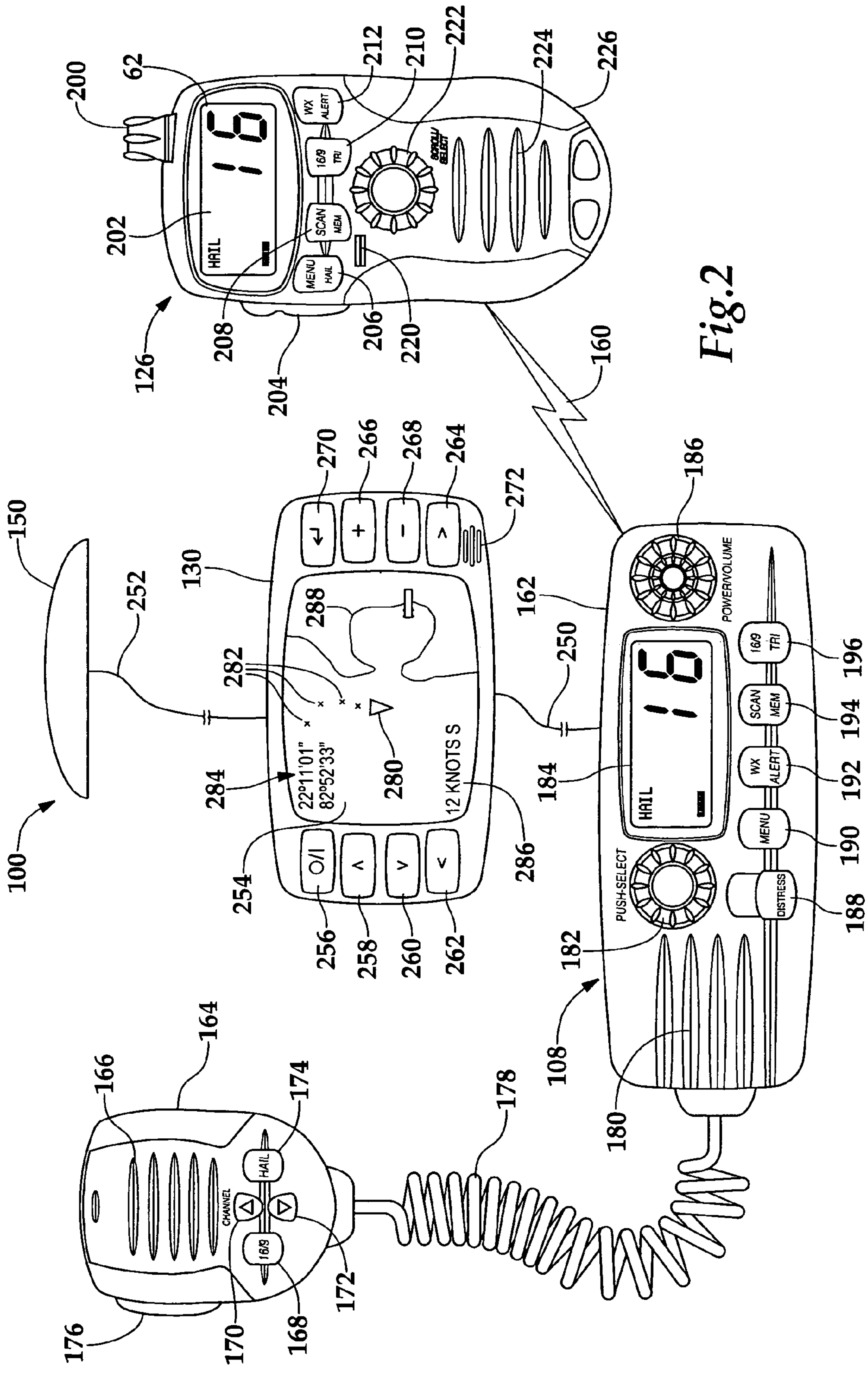
FIG. 2 is a front view of a marine radio communication system incorporating global positioning capability according to certain embodiments of the present invention.

Referring now to FIG. 2, marine radio communication system 100 is illustrated schematically. A first fixed mount marine radio 108 is in direct wireless communication with marine radio remote wireless handset 126 as represented by wireless communication link 160. In certain embodiments, the wireless communication may occur at 900 MHz, 2.4 Ghz or 5.8 GHz. It should be understood, however, that fixed mount marine radio 108 and marine radio remote wireless handset 126 may communicate at other frequencies depending on multiple considerations including technological limitations, manufacturing costs and government regulations.

Fixed mount marine radio 108 includes a fixed transceiver base 162 and a hand microphone 164. Fixed mount marine radio 108 is selectively operable to transmit marine radio frequency communications in a sending mode and receive marine radio frequency communications in a receiving mode. Hand microphone 164 connected to fixed mount marine radio 108 may include a microphone 166, function keys 168, 170, 172, 174 and push to talk actuator 176. Hand microphone 164 may receive acoustic inputs for marine radio frequency communication when fixed mount marine radio 108 is in the sending mode. Push to talk actuator 176 may selectively operate fixed mount marine radio 108 between the sending mode and the receiving mode. With this arrangement, when push to talk actuator 176 is depressed, acoustic input signals received by microphone 166 are transmitted by the attached fixed mount marine radio 108 over the currently selected marine radio frequency channel. As illustrated, the function keys may include 16/9 channel function key 168, channel selection keys 170, 172 and hailer key 174. The 16/9 channel key 168 tunes the fixed mount marine radio 108 to Channel 16 (156.8 MHz) with one click and to Channel 9 (156.45 MHz) with two clicks. Channel 16 is the international distress, safety and calling channel. Boaters use this channel to get the attention of another station in an emergency. Boats and ships required to carry a fixed mount marine radio 108 maintain a listening watch on this channel, as does the United States Coast Guard. Channel 9 is the boater calling channel established by the Federal Communications Commission (FCC) as a supplementary calling channel for noncommercial vessels and recreational boaters to ease the congestion of Channel 16. Accordingly, the ease of access that the 16/9 channel function key 168 provides to Channels 16 and 9 is very valuable on navigable waterways.

Channel selection keys 170, 172 provide easy channel selection with an up channel key 170 that switches to the next channel up and a down channel key 172 that switches to the next channel down. Hailer key 174 changes the mode of marine communication from wireless to auditory by switching the output of the attached fixed mount marine radio 108 from marine radio frequency antenna 112 to the attached loud speaker 110.

A wireline 178 connects hand microphone 164 to the fixed transceiver base 162 of fixed mount marine radio frequency transceiver 108. Fixed transceiver base 162 includes a speaker 180 that generates sound associated with marine communications when the fixed mount marine radio 108 is in its receiving mode. Push-select knob 182 facilitates navigation of software menus. Display 184 displays information about the function of fixed mount marine radio 108 such as the currently tuned channel. Power/volume control 186 controls transceiver power and audio output volume level.

As illustrated, the function keys associated with transceiver base 162 may include distress call key 188, menu key 190, weather (WX) alert key 192, scan memory key 194 and 16/9 TRI key 196. Distress call key 188 sends out a distress call in Digital Selective Calling (DSC). In general DSC is used to establish communications with ship or coast stations or to receive calls from other ships or coast stations. DSC works in conjunction with VHF, MF and HF radio systems and employs a two tone digital signal protocol to selectively call a particular station or to call a group of stations, all stations in a particular geographic area, or to call all stations.

Menu key 190 provides access to the software menus. The software menus provide features such as a programmable memory. WX alert key 192 changes the channel to the last used weather channel. Alternatively, the weather alert function may be equipped with Specific Area Message Encoding (SAME). Scan memory key 194 scans preprogrammed channels. The 16/9/TRI key 196 accesses Channel 16 and Channel 9 and provide a triple watch mode. It should be understood by those skilled in the art that although fixed mount marine radio 108 is illustrated and described above as having certain functions, other functions known in marine radio frequency communications are within the teachings of and do not depart from the present invention. For example, a fixed mount marine radio 108 is often equipped with a squelch control key in order to eliminate output noise when no marine communication or an extremely weak marine communication is received.

As depicted in FIG. 2, marine radio remote wireless handset 126 includes a channel selection knob 200. By turning channel selection knob 200 to the left or right, a channel may be selected. Marine radio remote wireless handset 126 relays the channel selection to the fixed mount marine radio 108 on a frequency, such as 900 Mhz, 2.4 Ghz or 5.8 Ghz. Fixed mount marine radio 108 then tunes in to the selected channel and relays marine communications to the marine radio remote wireless handset 126. Fixed mount marine radio 108 may tune into Coast Guard Channel 22A (157.1 MHz), the "piloting" Channel 13(156.65 MHz) or ship-to-ship safety Channel 6 (156.3 MHz), for example. It should be apparent to those skilled in the art that while fixed mount marine radio 108 sends and receives marine communications on a wide band of marine frequencies, such as VHF band, over medium range distances, marine radio remote wireless handset 126 sends and receives marine communications with fixed mount marine radio 108 via wireless communication link 160 at a different frequency band over relatively short range distances.

A display 202 is positioned on marine radio remote wireless handset 126 to provide a functionality similar to display 184 of fixed mount marine radio 108. A push to talk actuator 204 is positioned on the side of marine radio remote wireless handset 126. Similar to push to talk actuator 176, push to talk actuator 204 selectively operates fixed mount marine radio 108 and marine radio remote wireless handset 126 between the sending mode and the receiving mode. When push to talk actuator 204 is depressed, marine radio remote wireless handset 126 sends a signal to fixed mount marine radio 108 to switch fixed mount marine radio 108 to the sending mode. When push to talk actuator 204 is released, marine radio remote wireless handset 126 sends a signal to fixed mount marine radio 108 to switch fixed mount marine radio 108 to the receiving mode. It should be understood by those skilled in the art that although a particular system of control interrupts has been presented, alternative interrupt schemes are within the teachings of the present invention.

Function keys mounted on the marine radio remote wireless handset 126 include menu/hail key 206, scan memory key 208, 16/9 TRI key 210 and WX alert key 212. Function keys 206, 208, 210, 212 perform functions largely identical to function keys 168, 170, 172, 174 and 188, 190, 192, 194, 196 of fixed mount marine radio 108. As briefly described already and as will be described in more detail hereinbelow, when a function is selected on marine radio remote wireless handset 126, a command signal is sent to fixed mount marine radio 108 and reply signal is sent back to marine radio remote wireless handset 126 over wireless communication link 160. As described above, other functions known in marine communications may be employed with the marine radio remote wireless handset 126 of the present invention.

Microphone 220 receives sound for wireless communication when fixed mount marine radio 108 is in the sending mode. Scroll/select knob 222 provides a navigation tool for software menus on marine radio remote wireless handset 126. Speaker 224 generates sound associated with received wireless communications when fixed mount marine radio 108 is in the receiving mode. A waterproof casing 226 is positioned on the outside of the marine radio remote wireless handset 126 to provide protection from water. Optionally, marine radio remote wireless handset 126 may include a belt clip or other suitable carrying mechanism. It should be appreciated by those skilled in the art that although only one marine radio remote wireless handset 126 is presented communicating with fixed mount marine radio 108, more than one marine radio remote wireless handset 126 may be employed to communicate with fixed mount marine radio 108.

Fixed transceiver base 162 is operably connected to GPS receiver 130 through a GPS communication link 250. In various embodiments, GPS communication link 250 may represent a physical electrical connection, a wireless connection or an optical connection, as examples. GPS receiver 130 is, in turn, operably connected to GPS antenna 150 via GPS antenna link 252. Similarly to GPS communication link 250, GPS antenna link 252 may represent a physical electrical connection, a wireless connection or an optical connection, as examples. In certain embodiments, GPS antenna 150 may be disposed within the same physical enclosure as GPS receiver 130, while in other embodiments GPS receiver 130 and GPS antenna 150 may be disposed in separate enclosures. Similarly, in certain embodiments fixed transceiver base 162 and GPS receiver 130 may be disposed in a common enclosure.

GPS receiver 130 may have a number of components, some of which are depicted in FIG. 2. GPS receiver 130 may incorporate, for example, a display 254 for presentation of maps and menus, a power key 256 for powering GPS receiver 130 up and down, a set of navigation keys 258–264, zoom in and zoom out keys 266 and 268, an accept key 270 and a speaker 272 for audio output. In various embodiments, fewer or more components may be included. In certain embodiments, GPS receiver 130 may incorporate mapping capability and may include an internal memory for storage of geographical and waypoint data. In certain embodiments, GPS receiver 130 may be operable to receive updates to stored map data through external sources.

As shown in FIG. 2, display 254 may communicate a variety of data, including a current position and orientation icon 280, waypoints 282, current latitude and longitude data 284 and current velocity data 286. Display 254 may also communicate geographical data, including a graphical depiction of a shoreline 288. Although this capability and more may be included in GPS receiver 130, the data generated by GPS receiver 130 having primary importance for the purposes of the present invention includes current position data and/or current velocity data. So long as GPS receiver 130 is capable of determining either current position and/or current velocity, it is sufficiently functional to be employed in the context of the current invention.

Figure 3:
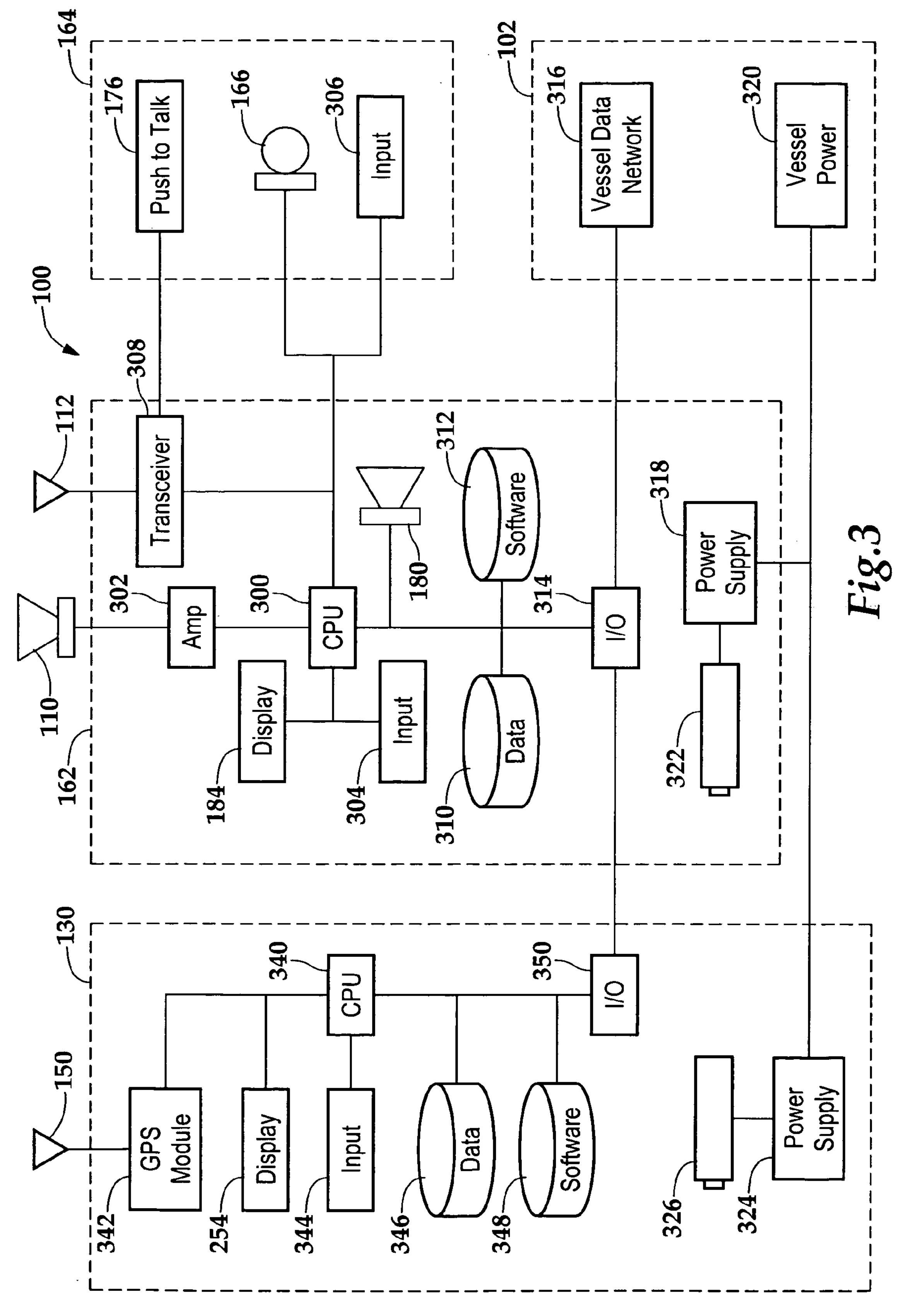
FIG. 3 is a schematic block diagram of a marine radio communication system incorporating global positioning capability according to a first embodiment.

Turning to FIG. 3, depicted therein is a schematic block diagram showing fixed transceiver base 162, GPS receiver 130 and components of marine vessel 102. A microprocessor 300 controls the operations of fixed mount marine radio 108. Loud speaker 110 is electrically coupled to the microprocessor 300 via amplifier 302 and positioned outside fixed transceiver base 162 as depicted by the placement outside the dashed lines. When fixed mount marine radio 108 is in the sending mode and the hailer function is activated, microprocessor 300 routes the marine communication through the loud speaker 110 for local auditory marine communications. Microphone 166 and speaker 180 are electrically coupled to microprocessor 300. Microphone 166 receives sound for marine communication when the fixed mount marine radio 108 is in the sending mode. Speaker 180 generates sound associated with received marine communications when the fixed mount marine radio 108 is in the receiving mode.

Display 184 is electrically coupled to microprocessor 300 to provide visual output for data such as the status of the hailer function and the current channel, for example. Inputs 304 and 306 are coupled to microprocessor 300. Inputs block 304 represents transceiver base functions such as power/volume control 186 and 16/9 TRI key 196, as examples. Similarly, inputs block 306 represents hand microphone inputs 168–174. Transceiver 308 is electrically coupled to microprocessor 300 to convert marine radio frequency signals received via antenna 112 into electrical signals for processing by microprocessor 300 and to convert electrical signals into marine radio frequency signals for transmission via antenna 112. An additional transceiver (not shown) sends and receives radio frequency signals to and from marine radio remote wireless handset 126 via wireless link 160.

Push to talk actuator 176 operates transceiver 308 and fixed mount marine radio 108 between sending and receiving modes. Antenna 112 radiates radio frequency signals toward remote stations, such as remote ship stations or coast stations, and receives radio frequency waves from remote stations. Data memory module 310 and software memory module 312 store the data necessary for the operation of fixed mount marine radio 108. An input/output module 314 controls communications between fixed mount marine radio 108, vessel data network 316 and GPS receiver 130. Power supply 318 regulates electrical power within fixed mount marine radio 108, by receiving power from vessel power grid 320 and regulating power within marine radio battery 322.

Although fixed mount marine radio 108 is illustrated with a particular configuration, fixed mount marine radio 108 may have a different configuration. For example, transceiver 308 and antenna 112 may be separate units connected to the fixed mount marine radio 108 via an input port (not shown). Moreover, antenna 112 may represent an antenna array rather than a discrete antenna. Additionally, fixed mount marine radio 108 may employ any power source such as a DC connection to a ship generator or batteries.

GPS receiver 130 is controlled by GPS CPU 340, which is operably connected to the principal functional components of GPS receiver 130, including GPS module 342, display 254, inputs 344, storage database 346, software database 348 and input/output module 350. GPS module 342 determines the global position of GPS receiver 130, and therefore marine vessel 102, based on signals received via GPS antenna 150 and provides this information to GPS CPU 340 and the other functional components of GPS receiver 130. Based upon the current position information, GPS CPU 340 may direct display 254 to display location information based on geographic data stored in database 346 according to programming instructions stored in software database 348. Although databases 346, 348 are shown as single databases, it will be appreciated by those of skill in the art that either or both of databases 346, 348 may represent multiple separate databases, such as a first database stored on an internal hard drive, a second database stored on a CD-ROM, DVD-ROM or flash memory card and a third database accessed via a wireless internet connection, as an example.

Input/output module 350 communicates with input/output module 314 of fixed transceiver base 162. In the embodiment shown in FIG. 3, input/output module 350 is operably connected to vessel data network 316 in order to share data with other components of marine vessel 316. Power to marine radio 108 and GPS receiver 130 is provided by vessel power 320 through marine radio power supply 318 and GPS receiver power supply 324 when available. Power to marine radio 108 and GPS receiver 130 is provided by marine radio battery 322 and GPS receiver battery 326 respectively whenever vessel power 320 is for some reason unavailable or off-line.

Figure 4:
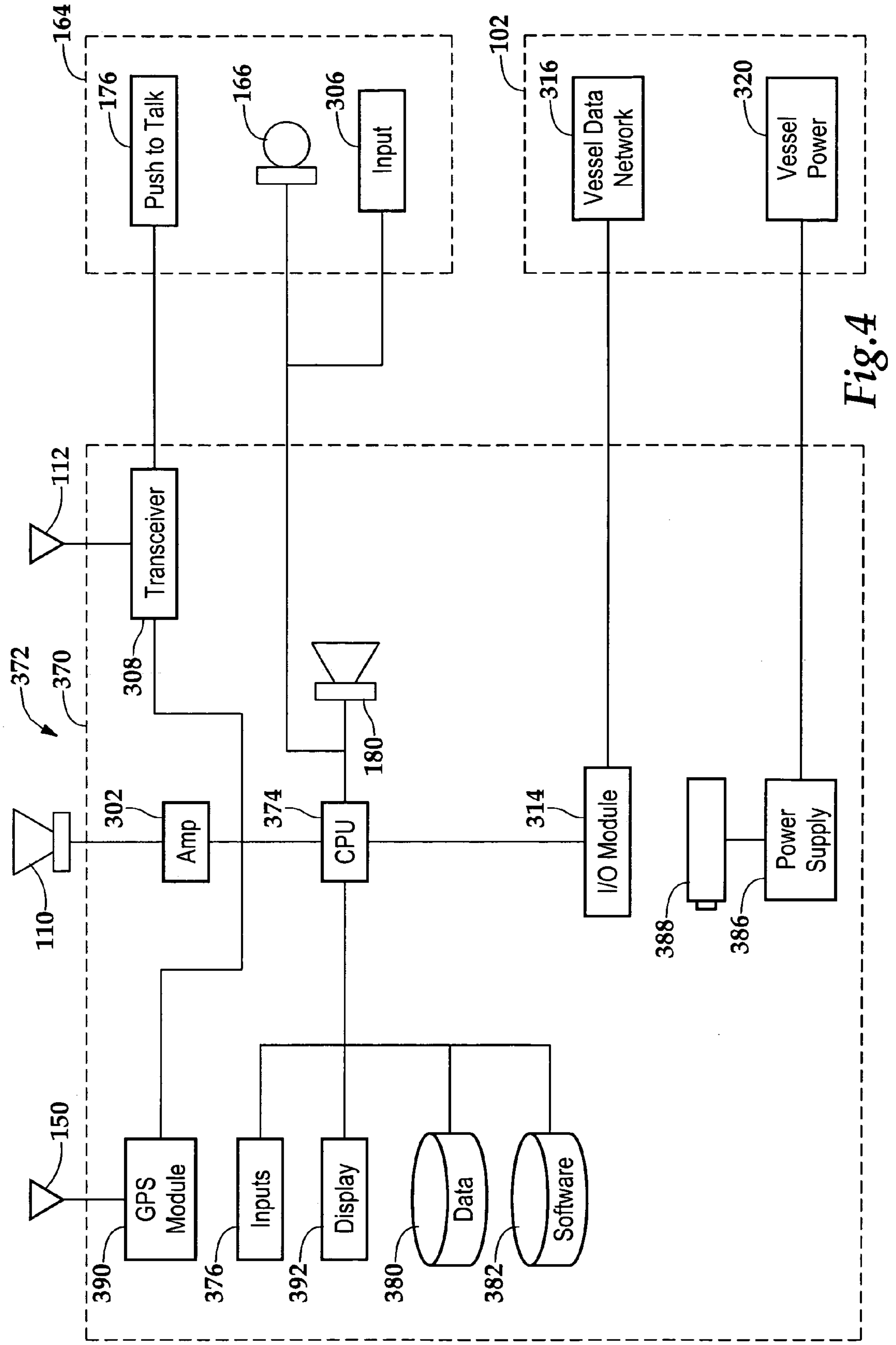
FIG. 4 is a schematic block diagram of a marine radio communication system incorporating global positioning capability according to a second embodiment.

Turning to FIG. 4, depicted therein is a schematic block diagram showing a second embodiment of the present invention in which the GPS receiver 130 is incorporated within a fixed GPS-enabled transceiver base 370 of a fixed mount marine radio 372. Microprocessor 374 controls the operations of fixed mount marine radio 372, including GPS decoding operations. As such, microprocessor 374 represents the combined functionality of marine radio microprocessor 300 and GPS receiver microprocessor 340 shown and described in FIG. 3. Those of skill in the art will appreciate that microprocessor 374 may, in a particular embodiment, represent two or more separate components.

Loud speaker 110 is electrically coupled to the microprocessor 374 via amplifier 302 and positioned outside fixed GPS-enabled transceiver base 370 as depicted by the placement outside the dashed lines. When fixed mount marine radio 372 is in the sending mode and the hailer function is activated, microprocessor 374 routes the marine communication through the loud speaker 110 for local auditory marine communications. Microphone 166 and speaker 180 are electrically coupled to microprocessor 374. Microphone 166 receives sound for marine communication when fixed mount marine radio 372 is in the sending mode. Speaker 180 generates sound associated with received marine communications when the fixed mount marine radio 372 is in the receiving mode.

Display 392 is electrically coupled to microprocessor 374 to provide visual output for data such as the status of the hailer function and the current channel, for example. Inputs, represented by inputs blocks 376, 306 are coupled to microprocessor 374. Inputs block 376 may represent transceiver base and GPS receiver functions such as power/volume control 186, 16/9 TRI key 196, and navigation keys 258–264, as examples. Similarly, inputs block 306 represents hand microphone inputs 168–174. Transceiver 308 is electrically coupled to microprocessor 374 to convert marine radio frequency signals received via antenna 112 into electrical signals for processing by microprocessor 374 and to convert electrical signals into marine radio frequency signals for transmission via antenna 112. An additional transceiver (not shown) sends and receives radio frequency signals to and from a marine radio remote wireless handset 126 via a wireless link (not shown).

In a similar manner to that described above in connection with FIG. 3, push to talk actuator 176 operates transceiver 308 and fixed mount marine radio 372 between sending and receiving modes. Antenna 112 radiates radio frequency signals toward remote stations, such as remote ship stations or coast stations, and receives radio frequency waves from remote stations. Data memory module 380 and software memory module 382 store the data necessary for the operation of fixed mount marine radio 372. Memory modules 380, 382 represent the combined functionality of marine radio memory modules 310, 312 and GPS receiver memory modules 346, 348. Input/output module 384 controls communications between fixed mount marine radio 372 and vessel data network 316. Power supply 386 regulates electrical power within fixed mount marine radio 372 by receiving power from vessel power grid 320 and regulating power within marine radio battery 388. As noted above in connection with fixed mount marine radio 108, although fixed mount marine radio 372 is illustrated with a particular configuration, fixed mount marine radio 372 may have a different configuration.

GPS functionality within fixed mount marine radio 372 is provided by GPS module 390, which is operably connected to microprocessor 374. GPS module 390 determines the global position of fixed mount marine radio 372, and therefore marine vessel 102, based on signals received via GPS antenna 150 and provides this information to microprocessor 374 and the other functional components of fixed mount marine radio 372. Based upon the current position information, microprocessor 374 may direct display 392 to display location information based on geographic data stored in memory module 380 according to programming instructions stored in software memory module 382. Although databases 380, 382 are shown as single databases, it will be appreciated by those of skill in the art that either or both of databases 380, 382 may represent multiple separate databases, such as a first database stored on an internal hard drive, a second database stored on a CD-ROM, DVD-ROM or flash memory card and a third database accessed via a wireless internet connection, as an example.

Figure 5:
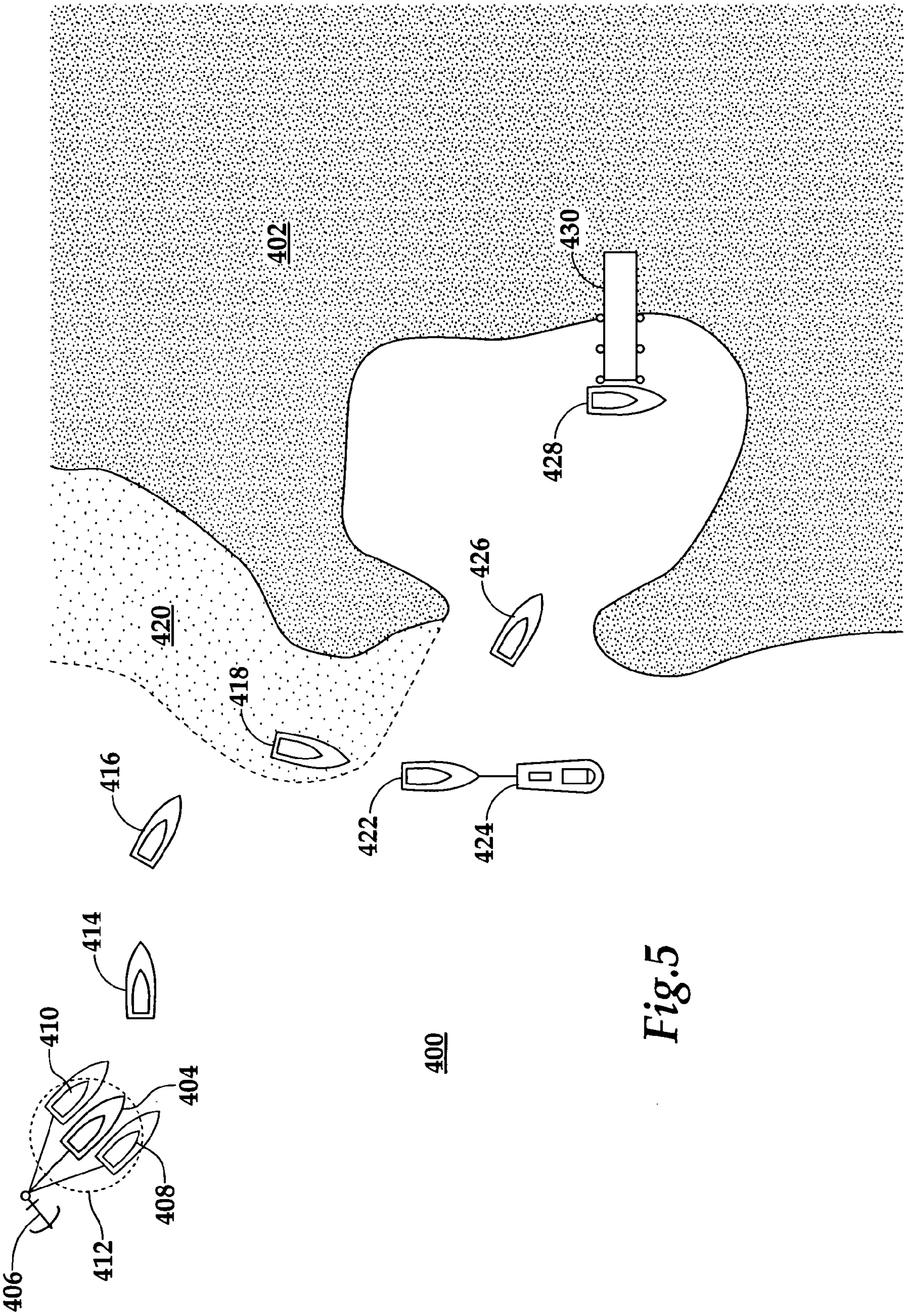
FIG. 5 depicts a map of a shoreline between a body of water and a land mass showing a course of a marine vessel according to the present invention.

The apparatus and methods of the present invention may be employed in a variety of environments. As an example of an environment in which the present invention may be employed, FIG. 5 depicts a map of a shoreline between a body of water 400 and a land mass 402. A waterborne vessel 404 is shown at various points in time along a path of travel, beginning at a point in time at which the vessel 404 is well offshore and ending at a point in time at which the vessel 404 is docked.

Vessel 404 is shown in the upper left of FIG. 5 offshore and secured to an anchor 406. Owing to the anchored state of vessel 404, its movement is restricted within a limited range of motion. The general range of motion of the vessel 404 as anchored is represented by circle 412. Within circle 412, vessel 404 may drift between positions 408, 410, but cannot drift beyond a certain limit due to anchor 406. As anchored, vessel 404 is in the 'stopped' condition. Accordingly, to the extent that conditions necessitate that vessel 404 use its foghorn, vessel 404 will employ the pattern for the 'anchored' condition while anchor 406 is down.

Using the GPS receiver 130 to detect the position of vessel 404, marine radio 108 will determine that vessel 404 is either not moving at all or is moving in such a manner as not to be considered 'underway' or 'undertow.' The GPS readings may indicate, for example, that vessel 404 is moving with some small velocity at any given point in time, but that the pattern of movement from one point in time to another is not consistent. Accordingly, marine radio 108 can determine from the pattern of GPS readings taken over a period of time that vessel 404 is either 'stopped', 'anchored' or 'aground'. In general, marine radio 108 will rely on a human user to distinguish between 'stopped', 'anchored' and 'aground' conditions. According to certain embodiments of the present invention, marine radio 108 will assume that a non-moving vessel is merely stopped unless the user specifically indicates that the vessel is anchored or aground.

Some time after the initial condition described above, vessel 404 retrieves anchor 406 and moved to position 414, and then on to position 416 under its own power. During this time, GPS receiver 130 will be producing a pattern of position readings reflecting a consistent pattern of motion in a general direction at a relatively consistent speed. Using this data, marine radio 108 can reasonably determine that the vessel 404 is no longer stopped or aground and is either 'underway' or 'undertow'. Accordingly, marine radio 108 will change the foghorn pattern to reflect the correct status. In certain embodiments of the present invention, fixed mount marine radio 108 will assume that a moving vessel is underway unless the user specifically indicates that the vessel is undertow.

Vessel 404 continues along its course from position 416 to position 418. Unfortunately for the occupants of vessel 404, there is a shoal 420 in the vicinity of position 418, upon which vessel 404 becomes lodged and is unable to move. Once vessel 404 runs aground on shoal 420, fixed mount marine radio 108 will begin registering GPS position readings reflecting that vessel 404 is not moving. After receiving a significant number of such readings in succession, fixed mount marine radio 108 will determine that vessel 404 is no longer underway, and must be considered stopped, anchored or aground. Fixed mount marine radio 108 will then change the status of the foghorn pattern from the pattern for the underway condition to a default pattern for non-moving conditions, such as the pattern for the stopped condition, as an example. The fixed mount marine radio 108 may also alert the user that there has been a change in status and query the user as to the proper status, at which point the user may select the anchored or aground condition.

Eventually, a towboat 424 comes to the assistance of vessel 404 and pulls it off the shoal 420 to position 424 in deeper water. Once vessel 404 begins moving, fixed mount marine radio 108 will begin registering GPS readings reflecting a pattern of consistent movement along a course. At this point, the fixed mount marine radio 108 will determine that another change in the foghorn pattern is necessary. Given the above-described assumptions, the fixed mount marine radio 108 would by default set the foghorn pattern to that proper for the underway condition, would alert the user as to the change in status and would query the user as to whether the proper status is underway or undertow.

After moving off the shoal 420, vessel 404 is released from the tow boat 424 to move under its own power to position 426. Unless vessel 404 comes to a stop after being released, fixed mount marine radio 108 will not identify the change in status from the undertow condition to the underway condition. Accordingly, it would be left to the user to manually set the foghorn pattern to from undertow to underway upon release from the tow boat 424.

Vessel 404 proceeds on course from position 426 to position 428, where it is secured to dock 430. As described above, fixed mount marine radio 108 will ascertain the change in status and set the foghorn pattern to the correct pattern for the stopped condition. The fixed mount marine radio will also alert the user as to the change and query the user as to whether the foghorn pattern should be set to aground or anchored.

Figure 6:
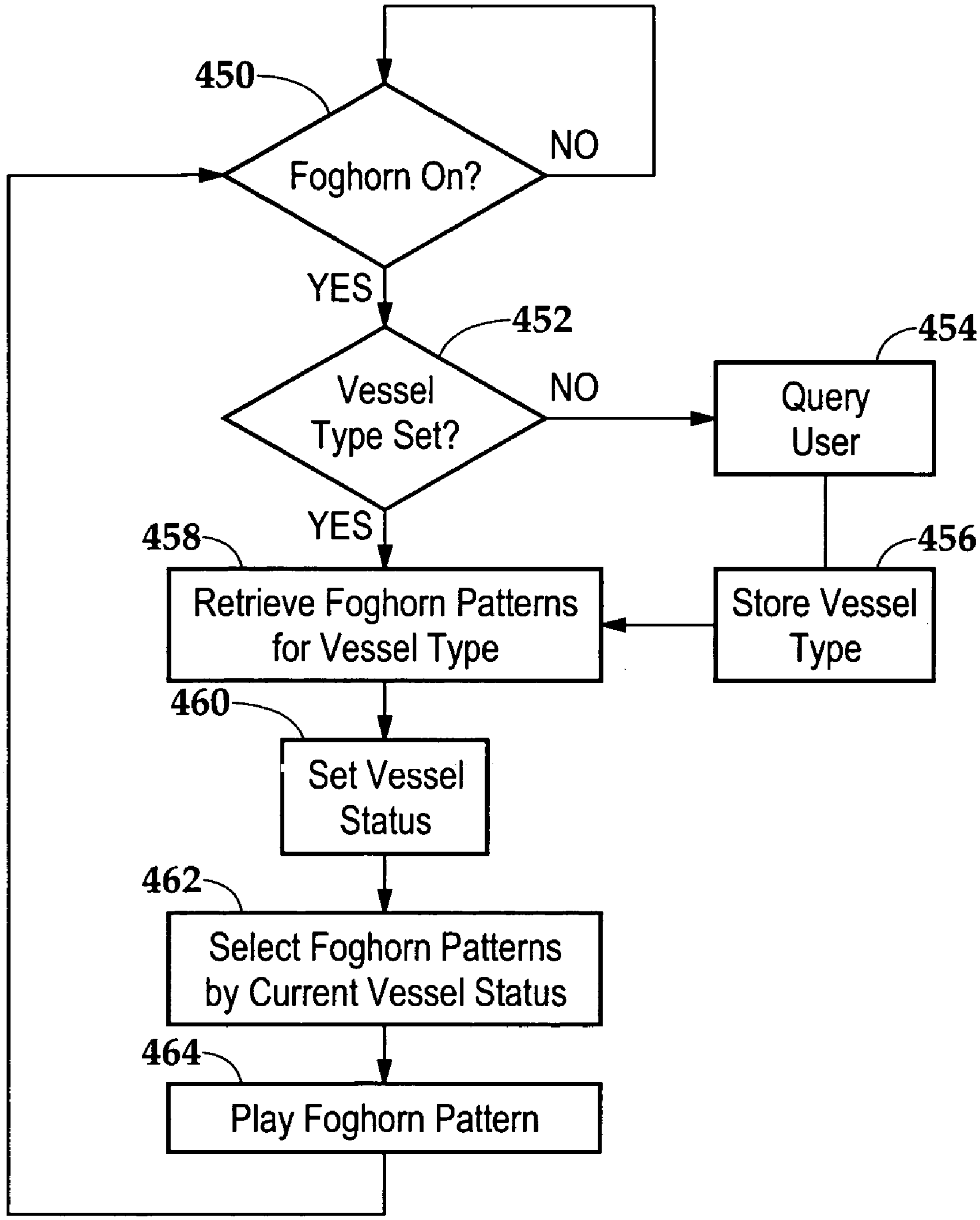
FIG. 6 is a flowchart depicting a method of playing a foghorn pattern according to certain embodiments of the present invention.

FIG. 6 is a graphical depiction of certain methods of the present invention in flowchart form. The process begins with an inquiry as to whether the foghorn status is 'on' in decision block 450. If the foghorn function is not turned on, process flow loops back to decision block 450 until the foghorn function is turned on.

Once the foghorn function is on, process flow proceeds to block 452, wherein the system inquires as to whether a vessel type has been selected. Normally, the vessel type will be set upon installation of the fixed mount marine radio 108 in a marine vessel. If the vessel type has previously been selected, process flow moves on to block 458, wherein foghorn patterns are retrieved for the selected vessel type. In the event that vessel type has not previously been set, process flow moves to block 454, wherein the system queries the user as to the correct vessel type. The vessel type information is stored in block 456 and process proceeds to block 458, wherein the correct foghorn patterns are retrieved.

Figure 7:
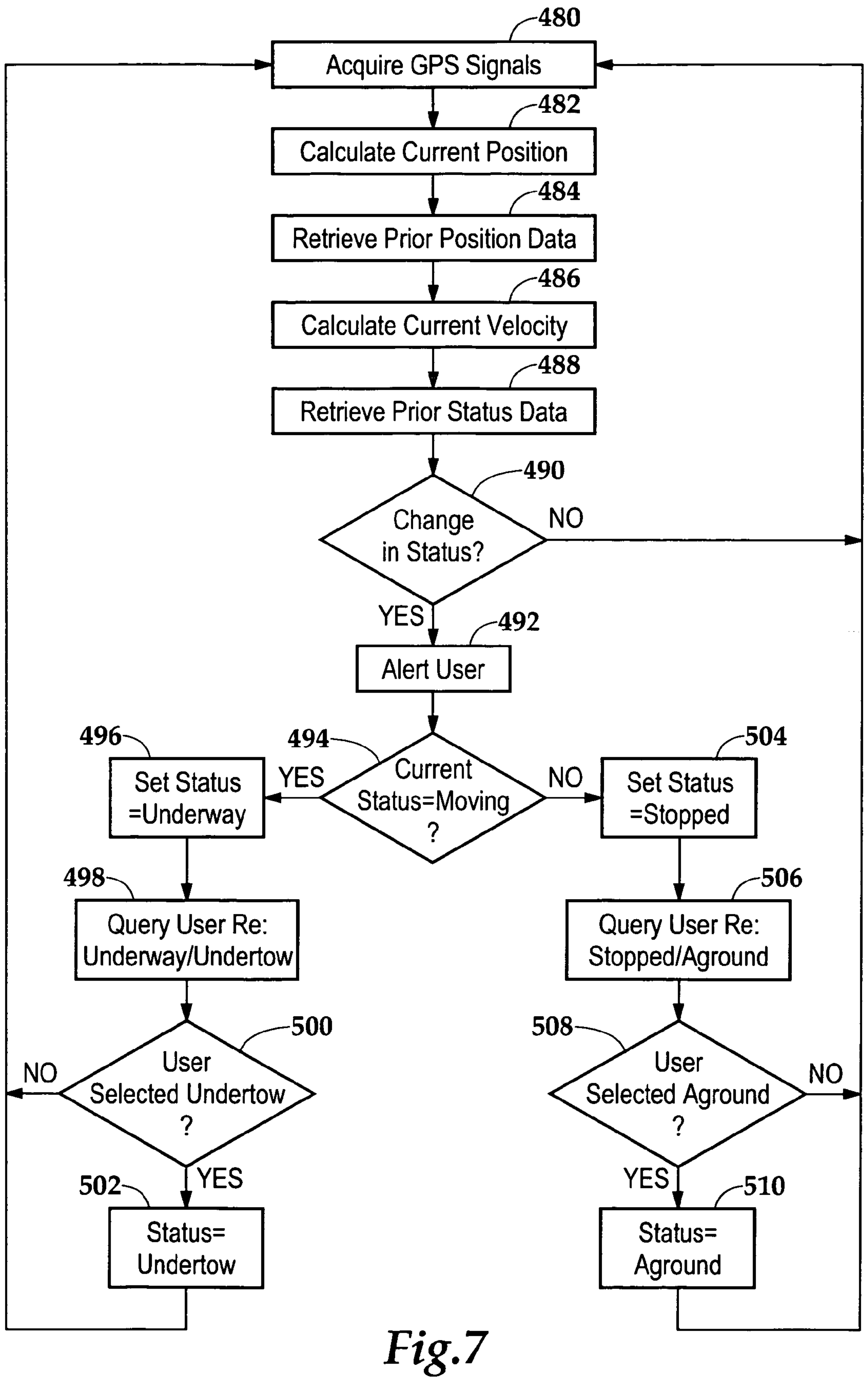
FIG. 7 is a flowchart depicting a method of determining the status of a marine vessel according to certain embodiments of the present invention.

After the foghorn patterns are retrieved, process flow moves to block 460, wherein the system determines the current status of the vessel. The status determined in block 460 will be underway, undertow, stopped, anchored or aground. The details of the vessel status determination process according to certain embodiments are shown in FIG. 7. Once the vessel status is determined in block 460, process flow proceeds to block 462, wherein a foghorn pattern is selected from the set of available foghorn patterns based on the vessel status. Finally, the foghorn pattern selected in block 462 is played over loudspeaker 110 in block 464.

The process of determining vessel status, represented by block 460 in FIG. 6, is shown in detail in FIG. 7. The process begins with the acquisition of GPS signals in block 480. Using the GPS signals acquired in block 480, the current position of vessel 102 is determined in block 482. Data indicating the prior position of vessel 102 is retrieved in block 484. Based upon the current position of vessel 102 calculated in block 482, the prior position of vessel 102 retrieved in block 484 and the time elapsed between the prior position and the current position, the current velocity of vessel 102 is calculated in block 486.

Data indicating the prior status of vessel is retrieved in block 488. This data will reflect that the vessel was previously determined to be underway, undertow, stopped, anchored or aground. Based upon the current velocity of vessel 102 either considered alone or in combination with other data, the system can determine whether or not the vessel is currently moving.

Decision block 490 routes process flow according to whether the current motion attributes of vessel 102 reflects a change in the vessel status. As an example, if vessel 102 is currently moving, and the prior status indicated vessel movement, there is not a change in vessel status. Similarly, if vessel 102 is currently stationary, and the prior status indicated a stationary vessel, there is not a change in vessel status. Conversely, if the vessel is currently moving, and the prior status indicated a stationary vessel, there is a change in vessel status. If there is no change in vessel status, process flow returns to block 480. If there has been a change in vessel status, process flow proceeds to block 492, where the user is alerted.

When there is a change in vessel status, the user may be alerted by a number of means. In certain embodiments, the user alert may be an audible alarm. In other embodiments, the user alert may be a visual notification on the display of fixed mount marine radio 108, or some other visual indication, such as a glowing or flashing light. Certain embodiments may generate a wireless signal to a remote apparatus, which may generate an alert using any of the above methods of alarm as well as a vibratory alarm. Finally, certain embodiments may combine any two or more of the above.

After the user alert is generated in block 492, process flow proceeds to decision block 494, in which the process flow is changed depending on whether vessel 102 is currently moving. If vessel 102 is currently moving, process flow proceeds to block 496. If vessel 102 is not currently moving, process flow proceeds to block 504.

Process flow through block 496 occurs when there is a change in vessel status and the vessel 102 is currently moving. In block 496, the status is set to a default status of underway. Process flow then proceeds from block 496 to block 498, where the user is queried as to whether vessel 102 is currently underway or undertow, and on to decision block 500. If the user does not select undertow status, process flow proceeds from decision block 500 back to block 480, where a new set of GPS signals is acquired. If the user does select undertow status, process flow proceeds from decision block 500 to block 502, where the status is set to undertow, and back to block 480.

Returning to decision block 494, if the there is a change in vessel status but the current status of the vessel 102 is not a moving status, process flow proceeds from decision block 494 to block 504, where the vessel status is set by default to 'stopped', and on to block 506. In block 506, the user is queried as to whether the vessel is aground, and process flow proceeds to decision block 508. If the user does not select aground status in response to the query, process flow proceeds from decision block 508 back to block 480, where a new set of GPS signals is acquired. If the user does select aground status, process flow proceeds from decision block 508 to block 510, where the vessel status is set per the input received from the user and process flow then returns to block 480.

It will be understood by those of skill in the art that the process shown in FIG. 7 is only one of a number of possible implementations of the methods of the present invention. For example, in certain embodiments, the default moving status may be undertow status and/or the default stationary status may be aground status. In certain embodiments, the default status for a moving and/or stationary vessel may be selected by the user. Certain embodiments of the present invention may employ more or fewer modes in a particular application. User customization up to and including a fully user-customizable foghorn pattern selection method is within the spirit and scope of the present invention.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A marine vessel operable to emit an audible signal based upon the velocity status of the marine vessel comprising:

a first processor component operable to determine the velocity of the marine vessel based upon global positioning signal inputs;

a database containing a set of at least two audible signals;

a second processor component operable to select an audible signal from the set of at least two audible signals based on the velocity of the marine vessel; and a loudspeaker that emits the selected audible signal from the marine vessel.

2. The marine vessel as recited in claim 1 wherein the first processor component is a portion of a global positioning system receiver.

3. The marine vessel as recited in claim 1 wherein the second processor component is a portion of a fixed mount marine radio.

4. The marine vessel as recited in claim 1 wherein the selected audible signal represents the foghorn pattern for a marine vessel underway, undertow, stopped, aground or anchored.

5. The marine vessel as recited in claim 1 wherein the first and second processor components are portions of a single processor.

6. The marine vessel as recited in claim 1 wherein the audible signals are stored in an electronic format selected from the group comprising .wav files, .mp3 files, tone generation integrated circuits and .wma files.

7. An apparatus for emitting an audible signal from a marine vessel having a velocity comprising:

a processor operable to calculate the velocity of the marine vessel using global positioning signals;

a means for selecting an audible signal from a set of at least two audible signals based on signal selection criteria comprising the velocity of the marine vessel; and a means for emitting the audible signal from the marine vessel.

8. The apparatus as recited in claim 7 wherein the processor is a portion of a global positioning system receiver.

9. The apparatus as recited in claim 7 wherein the apparatus is disposed within a fixed mount marine radio.

10. The apparatus as recited in claim 7 wherein the selected audible signal represents the foghorn pattern for a marine vessel underway, undertow, stopped, aground or anchored.

11. The apparatus as recited in claim 7 wherein the signal selection criteria comprise the type of the marine vessel.

12. The apparatus as recited in claim 7 wherein the audible signals are stored in an electronic format selected from the group comprising .wav files, .mp3 files, tone generation integrated circuits and .wma files.

13. A method of emitting an audible signal from a marine vessel having a velocity comprising the steps of:

determining the velocity of the marine vessel using global positioning signals;

selecting an audible signal from a set of at least two audible signals based on signal-selection criteria comprising the velocity of the marine vessel; and emitting the audible signal from the marine vessel.

14. The method as recited in claim 13 wherein the step of determining the velocity of the marine vessel further comprises receiving first and second sets of global positioning signals at first and second times.

15. The method as recited in claim 13 further comprising the step of determining the status of the marine vessel and wherein the signal selection criteria further comprise the type of the marine vessel.

16. The method as recited in claim 13 wherein the selected audible signal represents the foghorn pattern for a marine vessel underway, undertow, stopped, aground or anchored.

17. The method as recited in claim 13 wherein the audible signals are stored in an electronic format selected from the group comprising .wav files, .mp3 files, tone generation integrated circuits and .wma files.

* * * * *